(12) United States Patent
Omori

(10) Patent No.: US 10,138,934 B2
(45) Date of Patent: Nov. 27, 2018

(54) THRUST BEARING

(71) Applicant: IHI CORPORATION, Tokyo (JP)

(72) Inventor: Naomichi Omori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 15/635,432

(22) Filed: Jun. 28, 2017

(65) Prior Publication Data

US 2017/0298983 A1 Oct. 19, 2017

Related U.S. Application Data

(63) Continuation of application No. PCT/JP2016/053753, filed on Feb. 9, 2016.

(30) Foreign Application Priority Data

Feb. 10, 2015 (JP) ................................. 2015-024442

(51) Int. Cl.
    *F16C 27/02*    (2006.01)
    *F16C 17/04*    (2006.01)
    *F16C 33/10*    (2006.01)
    *F16C 17/24*    (2006.01)

(52) U.S. Cl.
CPC ............ *F16C 27/02* (2013.01); *F16C 17/042* (2013.01); *F16C 17/24* (2013.01); *F16C 33/101* (2013.01); *F16C 2360/00* (2013.01); *F16C 2360/24* (2013.01)

(58) Field of Classification Search
CPC .. F16C 17/024; F16C 17/042; F16C 17/0456; F16C 17/10; F16C 27/02; F16C 33/101; F16C 33/106; F16C 37/002; F16C 2360/00; F16C 2360/23; F16C 2300/22;
(Continued)

(56) References Cited

U.S. PATENT DOCUMENTS 3,893,733 A    7/1975  Silver
4,225,196 A *  9/1980  Gray ..................... F16C 17/042
                                                          384/121
(Continued)

FOREIGN PATENT DOCUMENTS

CA    2888183 A1 *  4/2014  ............ F16C 17/042
CA    2899407 A1 *  7/2014  ............ F01D 25/168
(Continued)

OTHER PUBLICATIONS

European Patent Office, "Extended European Search Report," issued in European Patent Application No. 16 749 223.0, which is a European counterpart of U.S. Appl. No. 15/635,432, dated Sep. 14, 2018, 8 pages.

*Primary Examiner* — Marcus Charles

(57) ABSTRACT

A thrust bearing which is disposed to face a thrust collar provided in a rotation shaft is disclosed. The thrust bearing includes a top foil, a back foil, and a base plate. The back foil includes a plurality of back foil pieces which are arranged in a circumferential direction of the base plate, and the top foil includes a plurality of top foil pieces which are respectively disposed on the back foil pieces. An inner peripheral recessed portion is formed at a portion which supports an inner peripheral side end of the back foil piece in a surface supporting the back foil in the base plate.

10 Claims, 14 Drawing Sheets

(58) Field of Classification Search
CPC ...... F16C 17/026; F16C 2360/24; B23Q 1/70; B23Q 5/06
USPC .................................. 384/99, 103–106, 121
See application file for complete search history.

(56) References Cited

U.S. PATENT DOCUMENTS

| | | | | |
|---|---|---|---|---|
| 4,277,111 | A * | 7/1981 | Gray | F16C 17/042 384/124 |
| 4,277,112 | A * | 7/1981 | Heshmat | F16C 17/042 384/124 |
| 4,277,113 | A * | 7/1981 | Heshmat | F16C 17/024 384/124 |
| 4,296,976 | A * | 10/1981 | Heshmat | F16C 17/024 384/309 |
| 4,597,677 | A * | 7/1986 | Hagiwara | F16C 17/042 384/105 |
| 5,110,220 | A * | 5/1992 | Gu | F16C 17/042 384/103 |
| 5,248,205 | A * | 9/1993 | Gu | F16C 17/042 384/106 |
| 5,318,366 | A * | 6/1994 | Nadjafi | F16C 27/02 384/105 |
| 5,498,082 | A * | 3/1996 | Nadjafi | F16C 17/042 384/105 |
| 5,547,286 | A * | 8/1996 | Struziak | F16C 17/042 384/105 |
| 5,833,369 | A | 11/1998 | Heshmat | |
| 5,871,284 | A * | 2/1999 | Nadjafi | F16C 17/042 384/105 |
| 5,961,217 | A | 10/1999 | Heshmat | |
| 6,224,263 | B1 | 5/2001 | Saville | |
| 6,354,741 | B1 | 3/2002 | Saville | |
| 6,752,533 | B2 * | 6/2004 | Saville | F16C 17/042 384/105 |
| 7,497,627 | B2 * | 3/2009 | Saville | F16C 17/042 384/105 |
| 8,602,653 | B2 * | 12/2013 | Heshmat | B23Q 1/70 384/103 |
| 2011/0150376 | A1 | 6/2011 | Lee | |
| 2012/0207414 | A1 * | 8/2012 | Kim | F16C 17/042 384/105 |

FOREIGN PATENT DOCUMENTS

| | | | |
|---|---|---|---|
| CA | 2924427 A1 * | 3/2015 | ............ F16C 17/042 |
| CN | 103291745 A | 9/2013 | |
| JP | S60-008524 A | 1/1985 | |
| JP | S61-038324 U | 3/1986 | |
| JP | S61-092316 A | 5/1986 | |
| JP | S61-140217 U | 8/1986 | |
| JP | H10-331847 A | 12/1998 | |
| JP | 2002-535570 A | 10/2002 | |
| JP | 2011-017385 A | 1/2011 | |
| JP | 2012-193832 A | 10/2012 | |
| KR | 2009-0060661 A | 6/2009 | |
| KR | 20120063111 A * | 6/2012 | ............ F16C 17/042 |

\* cited by examiner

THRUST BEARING

CROSS-REFERENCE TO RELATED APPLICATION

This application is a continuation application based on PCT Patent Application No. PCT/JP2016/053753, filed on Feb. 9, 2016, which claims priority to Japanese Patent Application No. 2015-024442, filed Feb. 10, 2015. The contents of both the PCT application and the Japanese Patent Application are incorporated herein by reference.

TECHNICAL FIELD

The present disclosure relates to a thrust bearing.

BACKGROUND ART

Hitherto, a thrust bearing which is disposed to face a thrust collar provided in a rotation shaft is known as a bearing for a high-speed rotation body. As such a thrust bearing, a foil type thrust bearing, that is, a thrust foil bearing, is known. In the thrust foil bearing, a bearing surface is formed by a flexible foil (a metallic thin plate) to absorb the motion of the rotation shaft (the axial displacement or inclination of the thrust collar) caused by a vibration or an impact, and a foil structure is provided below the bearing surface to flexibly support the bearing surface.

As one of such thrust foil bearings, a structure is known in which a bearing surface is formed by a plurality of circular ring (annular) plate-shaped foil pieces (top foil pieces) obtained by dividing an annular plate in the circumferential direction by cutting, and these top foil pieces are supported by corrugated foil pieces (bump foil pieces) (for example, see Patent Documents 1, 2, and 3). Each top foil piece (having a thickness of about 100 μm) has an inclination angle with respect to a thrust collar, and thus a bearing gap between the thrust collar and the top foil piece is formed in a wedge shape in the side view. That is, the bearing gap is formed to be narrowed from an upstream side toward a downstream side in the rotation direction of the thrust collar (the rotation shaft). Thus, when the thrust collar rotates from a side having a wide bearing gap (an upstream side) toward a side having a narrow bearing gap (a downstream side), a lubricating fluid flows into a wedge and load capacity is exerted.

Only an upstream end edge of the top foil piece in the rotation direction of the thrust collar (the rotation shaft) is fixed to a base plate. Then, when a bearing load increases, the top foil becomes horizontal while being inclined with a fixed edge (an upstream end edge) as a support point and maximum load capacity is exerted at the time of an inclination angle of about 0.10. The bump foil piece is disposed so that a ridge line of a peak becomes parallel to a downstream end edge of the top foil piece and only a downstream end edge of the bump foil piece in the rotation direction of the thrust collar (the rotation shaft) is fixed to the base plate. That is, the upstream end edge is a free end.

Since a pressure of a fluid lubricating film generated in the top foil piece increases at the side having a narrow bearing gap (the downstream side), the bump foil piece is disposed and fixed in this way to support this portion with high rigidity, whereby high load capacity is obtained.

CITATION LIST

Patent Document

[Patent Document 1]
Japanese Unexamined Patent Application, First Publication No. H 10-331847

[Patent Document 2]
Japanese Unexamined Patent Application, First Publication No. S61-092316

[Patent Document 3]
Japanese Unexamined Patent Application, First Publication No. 2011-17385

SUMMARY OF THE INVENTION

Technical Problem

In the thrust foil bearing structure, the bearing gap is narrowest at the downstream end edge side of the top foil and may reach a submicron level under a high load. Thus, the top foil easily contacts the thrust collar at the downstream end edge side. The durability of the bearing is degraded when the contact occurs and seizure occurs in the worst case. One way to prevent this problem is to adjust the downstream end edge of the top foil to be parallel to the thrust collar at all times.

However, generally, in the thrust foil bearing, since a circumferential speed of the thrust collar at the outer peripheral end side is faster than a circumferential speed at the inner peripheral end side, a pressure (a film pressure) of the fluid lubricating film at the outer peripheral end side is high. Since the circumferential speed at the inner peripheral end side is slow, the pressure (the film pressure) is low. For this reason, the outer peripheral end side of the top foil is press-inserted toward the bump foil to move in a direction away from the thrust collar, but the inner peripheral end side is raised toward the thrust collar to move toward the thrust collar. As a result, since the film thickness of the fluid lubricating film at the inner peripheral end side is extremely thinned at the downstream end edge side of the top foil, a high load cannot be withstood.

Here, in the known thrust bearing, the bump foil is divided into a plurality of parts in the radial direction as shown in, for example, Patent Document 1. Then, in the bump foil divided in this way, a method of suppressing the raising of the inner peripheral end side by (a) disposing the bump foil having low rigidity at the inner peripheral side or (b) lowering the height of the peak of the bump foil at the inner peripheral side in order to give a weak support force at the inner peripheral side of the top foil is considered.

However, even when the thrust bearing is manufactured by dividing and adjusting the bump foils in this way, for example, in the case of (a), the rigidity at the inner peripheral side and the outer peripheral side of the bump foil cannot be appropriately controlled in an easy way and thus there is difficulty in design of the bump foil. Further, in the case of (b), since the height of the peak of the bump foil needs to be controlled at the level of 10 μm, manufacturing is not easy and, particularly, quality cannot be ensured in mass production.

The present disclosure has been made in view of the above-described circumstances, and an object of the present disclosure is to provide a thrust bearing capable of withstanding a high load by preventing a top foil piece from contacting a thrust collar.

Solution to Problem

One aspect of a thrust bearing of the present disclosure is a thrust bearing which is disposed to face a thrust collar provided in a rotation shaft, including: a top foil which is disposed to face the thrust collar; a back foil which is disposed to face a surface opposite to a surface facing the thrust collar in the top foil and supports the top foil; and an annular plate-shaped base plate which is disposed at the side opposite to the top foil in the back foil and supports the back foil; wherein the back foil includes a plurality of back foil pieces which are arranged in a circumferential direction of the base plate, wherein the top foil includes a plurality of top foil pieces which are disposed on the back foil pieces, and wherein an inner peripheral recessed portion is formed at a portion which supports an inner peripheral side end of the back foil piece in a surface supporting the back foil of the base plate.

Effects

In the thrust bearing of the present disclosure, since the inner peripheral recessed portion is formed at a portion which supports the inner peripheral side end of the back foil piece in a surface supporting the back foil, it is possible to prevent an extreme decrease in film thickness of the fluid lubricating film at the inner peripheral end side by suppressing the raising of the inner peripheral end side of the top foil piece. Thus, according to the thrust bearing of the present disclosure, it is possible to obtain a thrust bearing that can prevent the top foil piece from moving toward the thrust collar to come into contact therewith and withstand a high load.

DESCRIPTION OF EMBODIMENTS

Hereinafter, a thrust bearing of the present disclosure will be described in detail with reference to the drawings. In the following drawings, the scales of members are appropriately changed so that all members have recognizable sizes.

Figure 1:
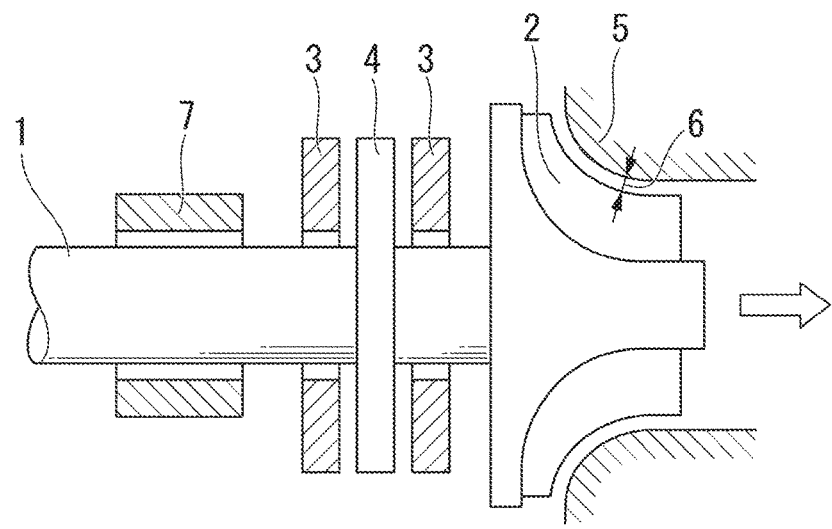
FIG. 1 is a schematic diagram showing an example of a turbo machine which employs a thrust bearing according to the present disclosure.

FIG. 1 is a side view schematically showing an example of a turbo machine which employs a thrust bearing of the present disclosure. In FIG. 1, reference numeral 1 denotes a rotation shaft, reference numeral 2 denotes an impeller provided at a front end of a rotation shaft, and reference numeral 3 denotes a thrust bearing according to the present disclosure.

A thrust collar 4 is fixed to a side in which the impeller 2 is formed in the rotation shaft 1 and a pair of thrust bearings 3 are disposed in the thrust collar 4 to sandwich the thrust collar 4.

Further, the impeller 2 is disposed inside a housing 5 which is a stationary side and has a tip clearance 6 between the impeller and the housing 5.

Further, a radial bearing 7 is provided at a center side in relation to the thrust collar 4 in the rotation shaft 1.

First Embodiment

Figure 2:
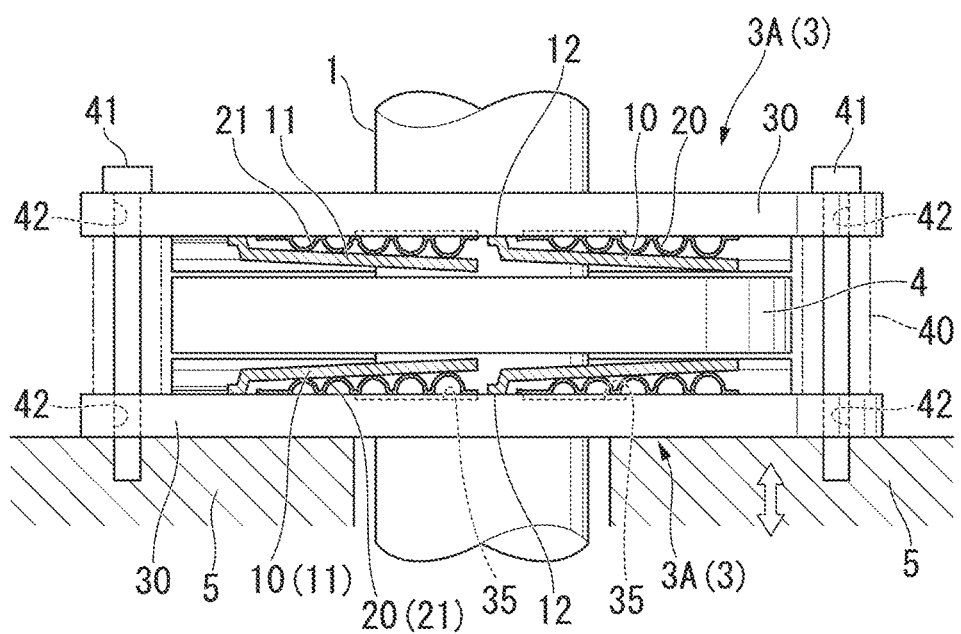
FIG. 2 is a diagram showing a first embodiment of the thrust bearing according to the present disclosure and is a side view of the thrust bearing when a main part is viewed in a cross-sectional view while a thrust collar is sandwiched by the thrust bearing.
Figure 3:
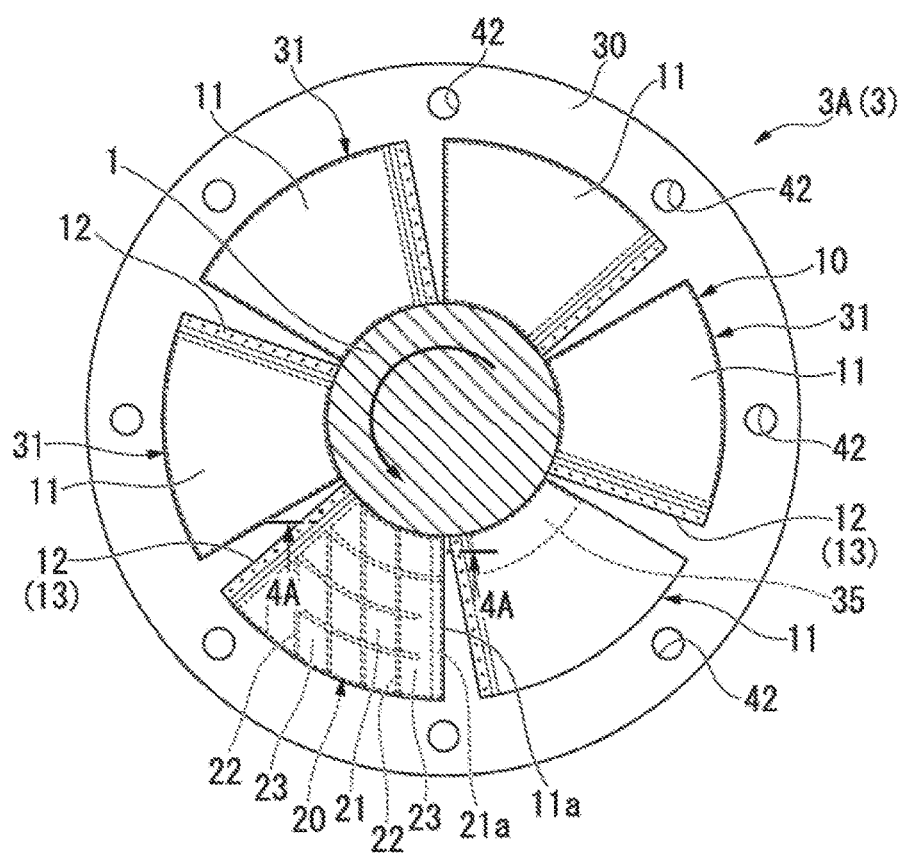
FIG. 3 is a top view of the first embodiment of the thrust bearing according to the present disclosure.
Figure 4A:
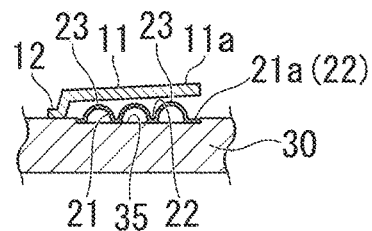
FIG. 4A is a diagram showing the first embodiment of the thrust bearing according to the present disclosure and is a cross-sectional view taken along a line 4A-4A of FIG. 3.
Figure 4B:
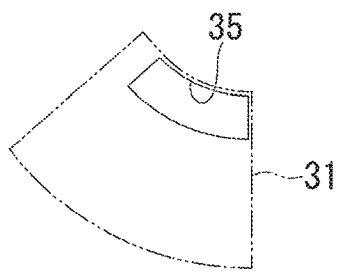
FIG. 4B is a diagram showing the first embodiment of the thrust bearing according to the present disclosure and is a top view of a support area of a base plate.
Figure 4C:
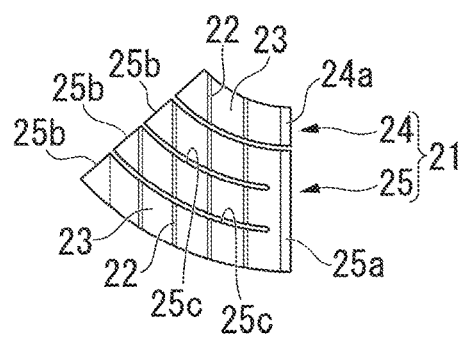
FIG. 4C is a diagram showing the first embodiment of the thrust bearing according to the present disclosure and is a top view of a bump foil piece.
Figure 4D:
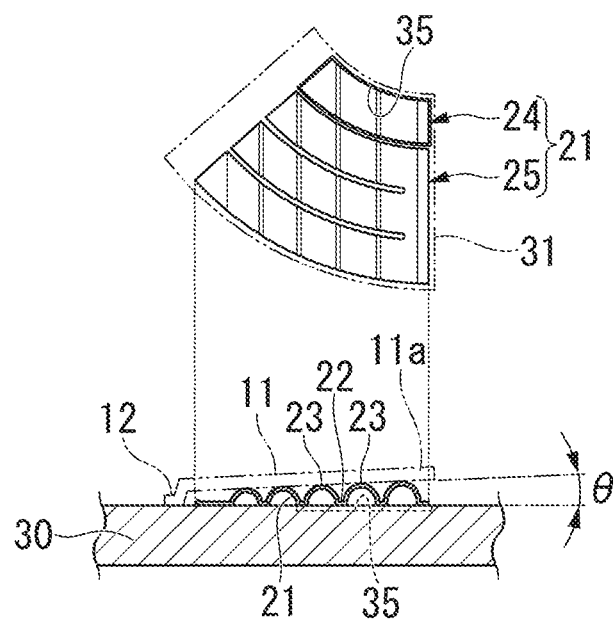
FIG. 4D is a diagram showing the first embodiment of the thrust bearing according to the present disclosure and is an explanatory diagram in which a top view and a side view are correlated with each other in order to describe the support area of the base plate and the bump foil piece.

FIGS. 2, 3, 4A, 4B, 4C, and 4D are diagrams showing a first embodiment of the thrust bearing 3 which is applied to the turbo machine with such a configuration, and FIG. 2 is a side view of the thrust bearing 3 when a main part is viewed in a cross-sectional view while the thrust collar 4 is sandwiched by the thrust bearings. Further, FIG. 3 is a top view of a thrust bearing 3A (3), FIG. 4A is a cross-sectional view taken along a line 4A-4A of FIG. 3, FIG. 4B is a top view of a support area 31 of a base plate, FIG. 4C is a top view of a bump foil piece 21, and FIG. 4D is an explanatory diagram in which a top view and a side view are correlated with each other in order to describe the support area 31 of the base plate and the bump foil piece 21.

As shown in FIG. 2, in the first embodiment, the thrust bearing 3A (3) is disposed at both sides with the thrust collar 4 interposed therebetween. The pair of thrust bearings 3A (3) have the same configuration, are formed in an annular shape (a cylindrical shape) while being disposed to face the annular plate-shaped thrust collar 4 fixed to the rotation shaft 1, and are externally fitted to the rotation shaft 1.

The thrust bearing 3A (3) includes a top foil 10 which is disposed to face the thrust collar 4, a back foil 20 which is disposed to face a surface opposite to a surface facing the thrust collar 4 in the top foil 10, and an annular plate-shaped base plate 30 which is disposed at the side opposite to the top foil 10 in the back foil 20. In the embodiment, a cylindrical bearing spacer 40 which is indicated by a two-dotted chain line is sandwiched between the base plates 30 of the pair of thrust bearings 3A (3), and the base plates 30 are connected to each other through the bearing spacer 40 by a fastening bolt 41. Further, an outer surface of one base plate 30 is fixed to the housing 5 by a fastening bolt 41, so that the pair of thrust bearings 3A (3) are fixed to the housing 5 by the fastening bolt 41 with the thrust collar 4 interposed therebetween.

As shown in FIG. 3, the base plate 30 is formed of a metal in an annular plate shape having a thickness of about several millimeters, and a plurality of (in the embodiment, eight) penetration holes 42 through which the fastening bolt 41 is inserted are provided on an outer peripheral portion thereof. A support area for supporting the back foil 20 or the top foil 10 is provided on the base plate 30 on a surface near the thrust collar 4. In the embodiment, as will be described later, the back foil 20 and the top foil 10 respectively include a plurality of (six) back foil pieces 21 and a plurality of (six) top foil pieces 11. Thus, an inner peripheral area of the base plate 30 is divided into six parts in the circumferential direction so that six support areas 31 are formed. Additionally, in the embodiment, these six support areas 31 are areas in design, and a separate boundary line or the like is not provided between the adjacent support areas 31.

Here, in the embodiment, as shown in FIGS. 4B and 4D, an inner peripheral recessed portion 35 which supports an inner peripheral side end of a back foil (a bump foil piece) to be described later is formed in these support areas 31. The inner peripheral recessed portion 35 is formed on a surface near the thrust collar 4 of the base plate 30 and is formed to be dug several tens of micrometers from a surface near the thrust collar 4. In the embodiment, the inner peripheral recessed portion 35 is formed in an arc strip shape in the top view. The inner peripheral recessed portion 35 is formed by grinding or the like, but can also be formed by other processing methods such as etching.

As shown in FIG. 2, the back foil piece 21 and the top foil piece 11 are disposed on the support areas 31 of the base plate 30 in this order to be supported by the areas.

As shown in FIG. 3, the back foil 20 includes six back foil pieces 21 which are arranged in the circumferential direction of the base plate 30. These back foil pieces 21 are disposed on the support areas 31 of the base plate 30 to be arranged in the circumferential direction of the base plate 30. Further, these back foil pieces 21 are formed to be slightly smaller than the top foil pieces 11 to be described later and thus are covered by the top foil pieces 11 on the base plate 30 so as not to be exposed toward the thrust collar 4 as shown in FIG. 3.

The back foil 20 including these back foil pieces 21 is formed of a foil (a thin plate) and elastically supports the top foil 10 (the top foil pieces 11). As such a back foil 20, for example, a bump foil, a spring foil described in Japanese Unexamined Patent Application, First Publication No. 2006-57652 or Japanese Unexamined Patent Application, First Publication No. 2004-270904, a back foil described in Japanese Unexamined Patent Application, First Publication No. 2009-299748, or the like is used. Further, the spring foil described in Japanese Unexamined Patent Application, First Publication No. 2006-57652 or Japanese Unexamined Patent Application, First Publication No. 2004-270904, and the back foil described in Japanese Unexamined Patent Application, First Publication No. 2009-299748, are foils used in a radial bearing, but when these foils are expanded in a plane shape and are formed in an annular plate shape, these foils can be used in a thrust bearing.

In the embodiment, as shown in FIGS. 3, 4A, 4C, and 4D, the back foil 20 is formed as a bump foil and thus the back foil piece 21 is formed as a bump foil piece. The bump foil piece 21 (the back foil piece) is formed in such a manner that a foil (a metallic thin plate) of about several hundreds of micrometers is formed into a corrugated shape by press molding. As shown in FIG. 4C, an apex side of a fan shape is cut out to be formed in a substantially trapezoidal shape on the whole in which each of an inner peripheral side and an outer circumference side is formed in a substantially are shape.

In this way, as shown in FIGS. 4A and 4D, in the bump foil piece 21 which is formed in a corrugated plate shape, valley portions 22 contacting the base plate 30 and peak portions 23 contacting the top foil piece 11 are formed alternately. The valley portions 22 form a lowermost bottom portion of the bump foil piece 21 (the back foil piece 21), and top portions (ridge lines) of the peak portions 23 form an uppermost top portion of the bump foil piece 21 (the back foil piece 21). Here, in the bump foil piece 21, an end edge 21a which is located at the downstream side in the rotation direction of the rotation shaft 1 shown in FIG. 3 is a fixed edge (a bump foil fixed edge) of the bump foil piece 21. As shown in FIG. 4C, the valley portions 22 and the peak portions 23 are arranged in a direction orthogonal to the fixed edge (the end edge 21a) of the bump foil piece 21. That is, the arrangement direction of the valley portions 22 and the peak portions 23 is formed in a direction orthogonal to the fixed edge, and thus the valley portions 22 and the peak portions 23 are formed to extend in parallel to the fixed edge.

The valley portions 22 and the peak portions 23 are formed at substantially the same pitch. Further, the height of the peak portions 23 is formed to increase by a predetermined height as shown in FIGS. 4A and 4D from the side opposite to a fixed edge 21a toward the fixed edge 21a, that is, toward the downstream side in the rotation direction of the rotation shaft 1 (the thrust collar 4) indicated by an arrow in FIG. 3.

In the embodiment, as shown in FIG. 4C, the entire bump foil piece 21 includes two parts, that is, a first part 24 which is an inner peripheral side end of the bump foil piece 21 and a second part 25 which is an outer peripheral side end thereof. As shown in FIG. 4D, the first part 24 is formed to be much smaller than the inner peripheral recessed portion 35 to entirely sink into the inner peripheral recessed portion 35 when the bump foil piece 21 is disposed on the support area 31 of the base plate 30. In the first part 24 which is disposed inside the inner peripheral recessed portion 35, an end edge 24a which is at the downstream side in the rotation direction of the rotation shaft 1 is fixed to the base plate 30 by spot-welding (point-welding), and a side opposite to the end edge 24a is a free end. In this way, since the first part 24 is disposed inside the inner peripheral recessed portion 35, positioning on the support area 31 is easy.

In the second part 25, one side in the circumferential direction, that is, the upstream side in the rotation direction of the rotation shaft 1, is equally divided into three parts in the radial direction and the end edge 25a at the other side is formed as a continuous edge which is continuous in the radial direction. In this way, since the side opposite to the end edge 25a is divided into three parts, the second part 25 includes three strip-shaped divided pieces 25b and the end edge 25a. Additionally, the end edge 21a, that is, the fixed edge 21a shown in FIG. 3, is formed by the end edge 24a of the first part 24 and the end edge 25a of the second part 25. Further, the first part 24 is formed to have the same radial width as the divided pieces 25b of the second part 25. Thus, the bump foil piece 21 including the first part 24 and the second part 25 has a shape in which the upstream side in the rotation direction of the rotation shaft 1, that is, one side in the circumferential direction, is divided into four divided pieces in appearance. Then, the divided piece located at the innermost peripheral edge side, that is, the first part 24 among the divided pieces, is disposed inside the inner peripheral recessed portion 35.

Slits 25c are formed among three strip-shaped divided pieces 25b in the second part 25. In the embodiment, these slits 25c are formed in an arc shape which forms a part of a circle concentric with a circle formed by the outer periphery of the second part 25. The widths of the slits 25c are set to lengths in which divided pieces 21b which are adjacent to each other in the radial direction can move independently without interference. Since one side of the second part 25 is divided into three strip-shaped divided pieces 25b by the slit 25c having such a width, these three strip-shaped divided pieces 25b move independently. Further, a gap which has substantially the same width as the slit 25c is formed between the first part 24 and the second part 25. Accordingly, a free end side of the first part 24 also moves independently similarly to the divided pieces 25b.

Additionally, in the embodiment, the bump foil piece 21 is formed so that the first part 24 and the second part 25 have substantially the same rigidity without particularly changing the rigidity between the inner peripheral side and the outer peripheral side. Further, top portions of the peak portions 23 which are arranged in the same row are formed to have substantially the same height. Accordingly, the bump foil piece 21 is easily designed and manufactured.

Further, in the bump foil piece 21, the end edge 24a and the end edge 25a which are located at the downstream side in the rotation direction of the rotation shaft 1 are disposed at the positions substantially matching the end edge 11a at the downstream side in the rotation direction of the rotation shaft 1 of the top foil piece 11 to be described later in the top view as shown in FIG. 3. Additionally, the end edge 25a of the second part 25 is also fixed to the base plate 30 by spot-welding (point-welding) along the forming direction of the valley portions 22 which form the end edge 25a.

Here, the end edge 24a or the end edge 25a can be fixed to the base plate 30 by, for example, threading or the like instead of spot-welding.

The top foil 10 also includes six top foil pieces 11 which are arranged in the circumferential direction of the base plate 30. These top foil pieces 11 are formed by a metallic thin plate (a foil) having a thickness of several hundreds of micrometers in a substantially trapezoidal shape in which an apex side of a fan shape is notched so that an inner peripheral side and an outer peripheral side are both formed in an arc shape. That is, the top foil piece is formed in a slightly elongated shape in the circumferential direction to have substantially the same shape as the bump foil piece 21. The top foil piece 11 with such a shape is disposed to cover the bump foil piece 21 on each support area 31 of the base plate 30, and the top foils are arranged at the same interval in the circumferential direction of the base plate 30 to form a substantially annular plate shape on the whole, thereby forming the top foil 10.

Additionally, the top foil piece 11 is formed to be much smaller than the support area 31 and to be slightly larger than the bump foil piece 21. Accordingly, the top foil pieces 11 are disposed on the support areas 31 without interference to cover the top surfaces while the bump foil pieces 21 are not exposed toward the thrust collar 4. Here, the present disclosure is not limited to this configuration, and the top foil piece 11 may be formed to have the same size as the bump foil piece 21 or may be formed to be smaller than the bump foil piece 21.

Further, in the top foil piece 11, an end edge at the upstream side in the rotation direction of the rotation shaft 1 (the thrust collar 4) is formed as the fixed edge 12, and the top foil piece is fixed to the base plate 30 by the fixed edge 12. That is, as shown in FIG. 4A, the fixed edge 12 is disposed to be separated from the bump foil piece 21 and is fixed to the base plate 30 by spot-welding (point-welding).

Further, as shown in FIG. 3, the top foil piece 11 includes a fixed portion 13 on the upstream side in the rotation direction of the rotation shaft 1 (the thrust collar 4) and is fixed to the base plate 30 by the fixed portion 13. In the embodiment, the fixed portion 13 is fixed to the base plate 30 by spot-welding (point-welding) at the fixed edge 12. Additionally, the fixed edge 12 can also be fixed to the base plate 30 by, for example, threading or the like instead of spot-welding. The fixed portion 13 may be formed in a plane shape or a linear shape as long as the fixed portion is provided at the upstream side in the rotation direction of the rotation shaft 1 (the thrust collar 4), but in the embodiment, the fixed portion is the fixed edge 12 which is formed in a linear shape to have a certain width.

Further, as shown in FIG. 4A, the top foil piece 11 is bent at the side of the fixed edge 12 and thus is raised to absorb a step corresponding to the height of the peak portions 23 of the bump foil piece 21. Then, a part on the side of the end edge 11a in relation to the fixed edge 12 is placed on the peak portions 23.

The end edge 11a (the trailing edge) is a free end which is simply supported on the peak portions 23 of the bump foil piece 21 without being fixed.

In the embodiment, as described above, the bump foil piece 21 is disposed so that the valley portions 22 and the peak portions 23 are arranged in a direction orthogonal to the fixed edge 21a of the bump foil piece 21. Thus, since the top foil piece 11 is placed on the bump foil piece 21, the top foil piece is disposed to be inclined at an initial inclination angle which is set by the peak portions 23 of the bump foil piece 21 to gradually move away from an inner surface of the base plate 30 from the fixed edge 12 toward the fixed edge 21a of the bump foil piece 21 in the arrangement direction of the peak portions 23.

Here, the initial inclination angle is an inclination angle of the top foil piece 11 with respect to the base plate 30 when a load is zero. Further, as shown in FIG. 4D, the inclination angle indicates an angle (an inclination angle or a gradient) θ which is determined by a height increase degree of the peak portions 23 of the bump foil piece 21. Thus, since the peak portions 23 of the bump foil piece 21 are press-inserted toward the base plate 30 to be flattened on the whole when a load increases, the inclination angle θ becomes smaller than the initial inclination angle.

Next, the operation of the thrust bearing 3A (3) with such a configuration will be described.

In the embodiment, as shown in FIG. 2, the thrust bearing 3A is provided at both sides of the thrust collar 4. In this way, when the thrust bearing is provided at both sides of the thrust collar 4, a movement amount in the thrust direction can be suppressed as much as possible. That is, since the thrust movement amount is small, the tip clearance 6 shown in FIG. 1 can be narrowed and thus fluid performance as a turbo machine can be improved.

In order to suppress the movement amount in the thrust direction as much as possible, both thrust bearings 3A are provided at a position close to the thrust collar 4 so that a large gap is not formed therebetween. Accordingly, the top foil pieces 11 (the top foils 10) of both thrust bearings 3A are slightly pressed against the thrust collar 4.

When the rotation shaft 1 rotates in such a state so that the thrust collar 4 starts to rotate, the thrust collar 4 and the top foil piece 11 rub against each other so that a peripheral fluid is press-inserted into a wedge-shaped space formed therebetween. Then, when the rotation speed of the thrust collar 4 reaches a predetermined rotation speed, a fluid lubricating film is formed therebetween. Due to the pressure of the fluid lubricating film, the top foil piece 11 (the top foil 10) is pressed against the bump foil piece 21 (the back foil 20), and the thrust collar 4 rotates in a non-contact state while the contact between the thrust collar and the top foil piece 11 is released.

When a thrust load is applied, the top foil piece 11 is further pressed toward the bump foil piece 21 so that the inclination angle θ of the top foil piece 11 becomes shallow (small). At this time, since the circumferential speed of the thrust collar 4 at the outer peripheral end side of the thrust bearing 3A (3) is faster than the circumferential speed at the inner peripheral end side, the top foil piece 11 is easily raised toward the thrust collar 4 at the inner peripheral end side having a low circumferential speed.

However, in the embodiment, the inner peripheral recessed portion 35 is formed at the inner peripheral end side of the base plate 30, that is, a portion supporting the inner peripheral side end of the bump foil piece 21, and the first part 24 constituting the inner peripheral side end of the bump foil piece 21 is disposed inside the inner peripheral recessed portion 35. For this reason, since the inner peripheral side end (the first part 24) of the bump foil piece 21 sinks into the inner peripheral recessed portion 35 even when the inner peripheral end side of the top foil piece 11 starts to be raised toward the thrust collar 4, a gap is formed between the top foil piece 11 and the bump foil piece 21. Accordingly, a force which presses back the inner peripheral end side of the top foil piece 11 toward the thrust collar 4 does not occur in the back foil piece 21 until this gap disappears. Thus, the inner peripheral end side of the top foil piece 11 is not raised.

Further, even when the inner peripheral end side of the top foil piece 11 is pressed toward the bump foil piece 21 so that the gap disappears, a spring reaction force generated by the bump foil piece 21 is weakened to the degree of the gap compared to the outer peripheral end side. Thus, the inner peripheral end side of the top foil piece 11 is not easily raised.

Thus, even when the film thickness of the fluid lubricating film is further thickened in accordance with an increase in thrust load, the top foil piece 11 does not easily contact the thrust collar 4 and thus a high thrust load can be received.

Further, since a part of the bump foil piece 21 at the upstream side in the rotation direction of the rotation shaft 1 is divided into four (a plurality of) parts in the radial direction, the first part 24 at the inner peripheral side and the divided pieces 25b at the outer peripheral side are independently operated. For this reason, deformation of the bump foil piece 21 which is generated when the top foil piece 11 is pressed toward the bump foil piece 21 becomes smooth in the radial direction, and thus a support force caused by the bump foil piece 21 (the back foil piece 21) also changes more smoothly from the inner peripheral side toward the outer peripheral side.

In the thrust bearing 3A (3) of the embodiment, since the inner peripheral recessed portion 35 is formed at a portion which supports the inner peripheral side end of the bump foil piece 21 in a surface supporting the back foil 20 (the bump foil 20) in the base plate 30, it is possible to prevent an extreme decrease in film thickness of the fluid lubricating film at the inner peripheral end side by suppressing the raising of the inner peripheral end side of the top foil piece 11. Thus, it is possible to obtain the thrust bearing 3A (3) that can prevent the top foil piece 11 from moving toward the thrust collar 4 to come into contact therewith and withstand a high load.

Second Embodiment

Figure 5A:
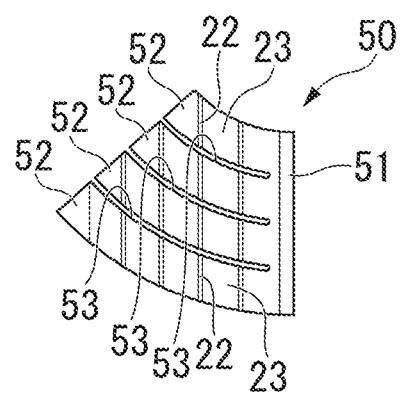
FIG. 5A is a diagram showing a second embodiment of the thrust bearing according to the present disclosure and is a top view of a bump foil piece.
Figure 5B:
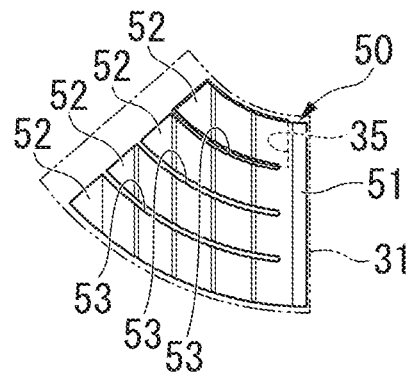
FIG. 5B is a diagram showing the second embodiment of the thrust bearing according to the present disclosure and is a top view illustrating a support area of a base plate and the bump foil piece.

Next, a second embodiment of the thrust bearing of the present disclosure will be described with reference to FIGS. 5A and 5B. Additionally, FIG. 5A is a top view of a bump foil piece 50 and FIG. 5B is a top view illustrating the support area 31 of the base plate and the bump foil piece 50. The thrust bearing of the second embodiment is mainly different from the thrust bearing 3A (3) of the first embodiment in that a single part is used as the bump foil piece 50 instead of the first part 24 and the second part 25 as shown in FIGS. 5A and 5B.

That is, in the bump foil piece 50 of the embodiment, the upstream side in the rotation direction of the rotation shaft 1, that is, one side of the circumferential direction, is equally divided into four (a plurality of) parts in the radial direction, and the end edge 51 (the fixed edge) which is the other side is formed as the continuous edge which is continuous in the radial direction. In this way, since the side opposite to the end edge 51 is divided into four parts, the bump foil piece 50 includes four strip-shaped divided pieces 52 and the fixed edge 51 (the continuous edge). Additionally, the valley portions 22 and the peak portions 23 are also provided on the bump foil piece 50 similarly to the bump foil piece 21.

The slits 53 are formed among four strip-shaped divided pieces 52 similarly to the second part 25 of the bump foil piece 21. By these slits 53, four divided pieces 52 move independently. Then, also in the embodiment, as shown in FIG. 5B, the inner peripheral recessed portion 35 is formed at the inner peripheral end side of the base plate 30, that is, a portion supporting the inner peripheral side end of the bump foil piece 50. The innermost peripheral divided piece 52 constituting the inner peripheral side end of the bump foil piece 50 is disposed inside the inner peripheral recessed portion 35.

Thus, substantially the entire divided piece 52 at the innermost peripheral side sinks into the inner peripheral recessed portion 35.

Also in the thrust bearing 3 of the embodiment, since the inner peripheral recessed portion 35 is formed at a portion supporting the inner peripheral side end of the bump foil piece 50, it is possible to prevent an extreme decrease in film thickness of the fluid lubricating film at the inner peripheral end side by suppressing the raising of the inner peripheral end side of the top foil piece 11. Thus, it is possible to obtain the thrust bearing 3 that can prevent the top foil piece 11 from moving toward the thrust collar 4 to come into contact therewith and withstand a high load.

Further, since one side of the bump foil piece 50 in the circumferential direction is divided in the radial direction to form the divided pieces 52, the divided pieces 52 are independently operated, and thus deformation of the bump foil piece 50 which is generated when the top foil piece 11 is pressed toward the bump foil piece 50 becomes smooth in the radial direction. Thus, a support force which is generated by the bump foil piece 50 also smoothly changes from the inner peripheral side toward the outer peripheral side.

Further, since the divided piece 52 at the innermost peripheral side among the divided pieces is disposed inside the inner peripheral recessed portion 35, the inner peripheral end side of the bump foil piece 50 reliably sinks into the inner peripheral recessed portion 35. Thus, a gap is reliably formed between the top foil piece 11 and the bump foil piece 50 at the inner peripheral end side of the top foil piece 11. Accordingly, it is possible to reliably prevent the top foil piece 11 from contacting the thrust collar 4.

Further, since the divided pieces 52 of the bump foil piece 50 are integrated by the end edge 51 which is the continuous edge, the bump foil piece 50 is easily handled and the bump foil piece 50 is easily fixed onto the base plate 30.

Third Embodiment

Next, a third embodiment of the thrust bearing of the present disclosure will be described.

Figure 6A:
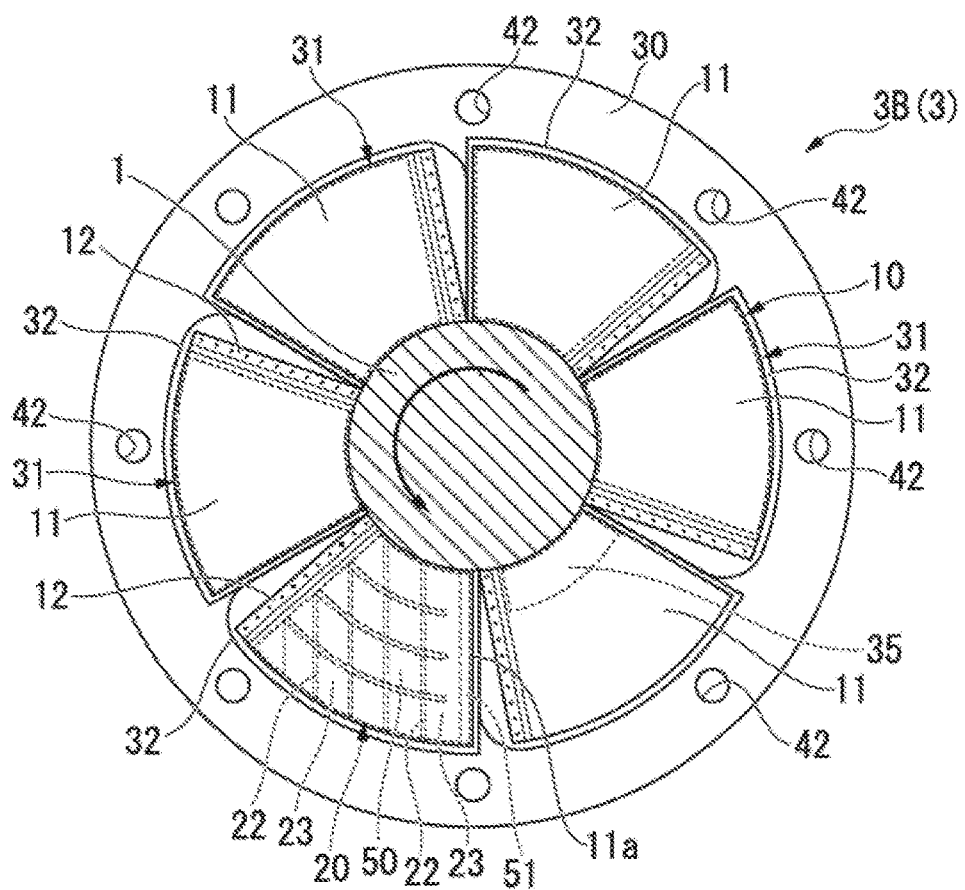
FIG. 6A is a diagram showing a third embodiment of the thrust bearing according to the present disclosure and is a top view of a thrust bearing 3.
Figure 6B:
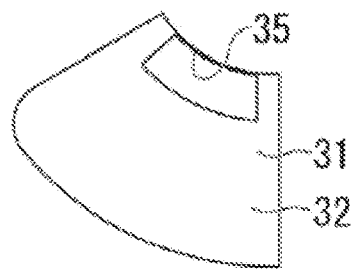
FIG. 6B is a diagram showing the third embodiment of the thrust bearing according to the present disclosure and is a top view of a support area of a base plate.
Figure 6C:
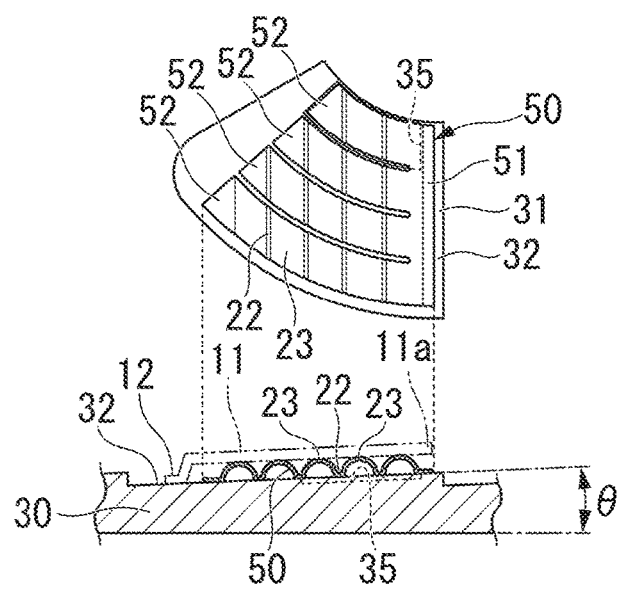
FIG. 6C is a diagram showing the third embodiment of the thrust bearing according to the present disclosure and is an explanatory diagram in which a top view and a side view are correlated with each other in order to describe the support area of the base plate and a bump foil piece.

A thrust bearing 3B (3) of the third embodiment is mainly different from the thrust bearing of the second embodiment in that an inclined surface 32 is formed in the support area 31 of the base plate 30, and the peak portions 23 of the bump foil piece 50 have the same height as shown in FIGS. 6A, 6B, and 6C. Additionally, FIG. 6A is a top view of the thrust bearing 3B (3), FIG. 6B is a top view of the support area 31 of the base plate, and FIG. 6C is an explanatory diagram in which a top view and a side view are correlated with each other in order to describe the support area 31 of the base plate and the bump foil piece 50.

In the embodiment, as shown in FIG. 6A, an entire area which supports the bump foil piece 50 and the top foil piece 11 in the support area 31 is formed as the inclined surface 32 which increases in height as it goes from the fixed edge 12 of the top foil piece 11 toward the downstream end edge 11a.

That is, the inclined surface 32 is formed to be inclined in a direction orthogonal to the end edge 11a as shown in FIG. 6C.

Further, the bump foil piece 50 in which four divided pieces 52 are integrated by the end edge 51 corresponding to the continuous edge is used similarly to the second embodiment. Thus, the bump foil piece 50 is also formed in a corrugated shape in which the valley portion 22 contacting the base plate 30 and the peak portion 23 contacting the top foil piece 11 are alternately disposed similarly to the first embodiment. Here, in the embodiment, as shown in FIG. 6C, the peak portions 23 have the same height.

Further, the valley portion 22 and the peak portion 23 are arranged in a direction intersecting the fixed edge 12 of the top foil piece 11 similarly to the first embodiment and the second embodiment. That is, the arrangement direction of the valley portion 22 and the peak portion 23 is set to a direction intersecting the fixed edge 12 and is aligned to the inclination direction of the inclined surface 32. Accordingly, the height of the peak portion 23 of the bump foil piece 50 increases by a predetermined height in the inclination direction of the inclined surface 32 of the base plate 30, that is, in a direction toward the downstream side in the rotation direction of the rotation shaft 1. That is, the bump foil piece has the same appearance as those of the first embodiment and the second embodiment. Thus, the top foil piece 11 which is disposed on the bump foil piece 50 is formed so that the inclination angle θ is the same as those of the first embodiment and the second embodiment. In the embodiment, the inclination angle θ is determined by the inclination angle θ of the inclined surface 32 as shown in FIG. 6C.

Further, also in the embodiment, as shown in FIG. 6C, the inner peripheral recessed portion 35 is formed at the inner peripheral end side of the base plate 30, that is, a portion which supports the inner peripheral side end of the bump foil piece 50. The divided piece 52 at the innermost peripheral side constituting the inner peripheral side end of the bump foil piece 50 is disposed inside the inner peripheral recessed portion 35. Thus, substantially the entire divided piece 52 at the innermost peripheral side sinks into the inner peripheral recessed portion 35.

Here, in the embodiment, a bottom surface of the inner peripheral recessed portion 35 is formed in parallel to the inclined surface 32 of the base plate 30, and thus a bottom surface of the inner peripheral recessed portion 35 is also an inclined surface. Accordingly, the height of the divided piece 52 at the innermost peripheral side of the bump foil piece 50 sinking into the inner peripheral recessed portion 35 also increases by a predetermined height as the height of the peak portion 23 approaches the downstream side in the rotation direction of the rotation shaft 1.

Also in the thrust bearing 3B (3) of the embodiment, since the inner peripheral recessed portion 35 is formed at a portion which supports the inner peripheral side end of the bump foil piece 50, it is possible to prevent an extreme decrease in film thickness of the fluid lubricating film at the inner peripheral end side by suppressing the raising at the inner peripheral end side of the top foil piece 11. Thus, it is possible to obtain the thrust bearing 3B (3) capable of preventing the top foil piece 11 from moving toward the thrust collar 4 to come into contact therewith and withstanding a high load.

Further, since the inclined surface 32 is formed in each support area 31 of the base plate 30, the peak portions 23 of the bump foil piece 21 have the same height, and the arrangement direction of the peak portions 23 matches the inclination direction of the inclined surface 32, it is possible to highly accurately change the height of the top foil piece 11 along the inclined surface 32 by disposing the top foil piece 11 on the inclined surface 32 through the bump foil piece 50. That is, a predetermined inclination angle θ can be given to the top foil piece 11. At that time, the bump foil piece 50 can be manufactured at a uniform height without a change in height of the peak portion 23 and thus an increase in manufacturing cost can be suppressed. Thus, according to the thrust bearing 3B (3), since processing is easy, mass productivity is improved and cost can be decreased. Further, since processing is easy and variations are reduced, bearing performance (for example, bearing load capacity) which is predicted at the time of designing is easily obtained.

Additionally, in the third embodiment, the bump foil piece 50 of the second embodiment is used as the bump foil piece, but the bump foil piece 21 of the first embodiment can be used instead.

Fourth Embodiment

Next, a fourth embodiment of the thrust bearing of the present disclosure will be described.

Figure 7:
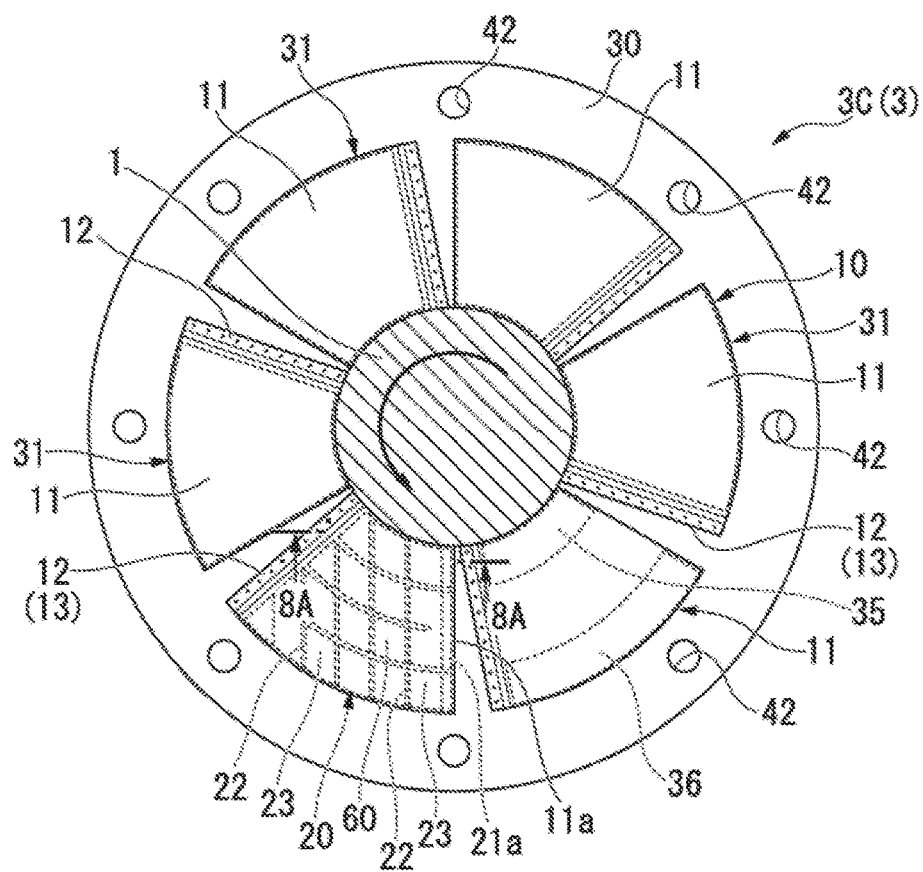
FIG. 7 is a top view of a fourth embodiment of the thrust bearing according to the present disclosure.
Figure 8A:
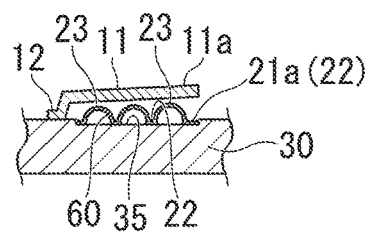
FIG. 8A is a diagram showing the fourth embodiment of the thrust bearing according to the present disclosure and is a cross-sectional view taken along a line 8A-8A of FIG. 7.
Figure 8B:
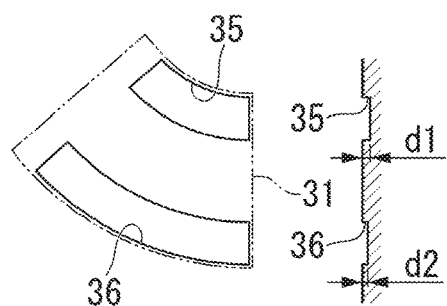
FIG. 8B is a diagram showing the fourth embodiment of the thrust bearing according to the present disclosure and is an explanatory diagram in which a top view and a side view of a support area of a base plate are correlated with each other.
Figure 8C:
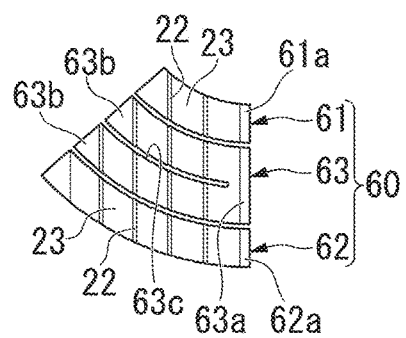
FIG. 8C is a diagram showing the fourth embodiment of the thrust bearing according to the present disclosure and is a top view of a bump foil piece.
Figure 8D:
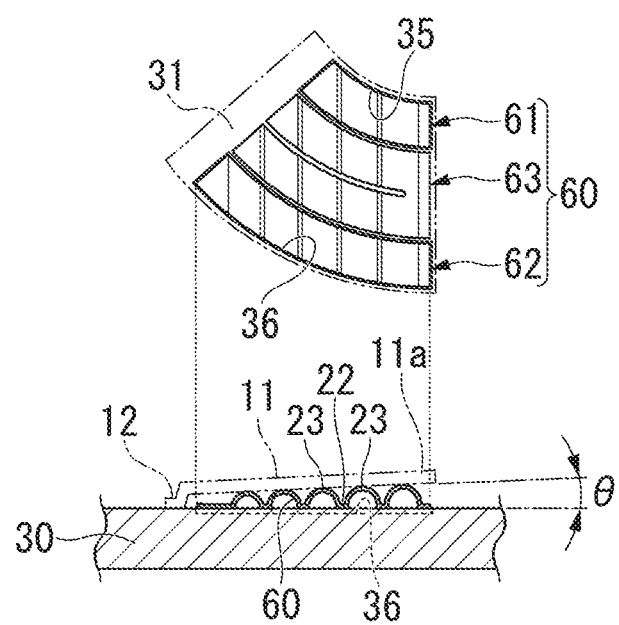
FIG. 8D is a diagram showing the fourth embodiment of the thrust bearing according to the present disclosure and is an explanatory diagram in which a top view and a side view are correlated with each other in order to describe the support area of the base plate and the bump foil piece.

A thrust bearing 3C (3) of the fourth embodiment is mainly different from the thrust bearing 3A (3) of the first embodiment in that an outer peripheral recessed portion 36 is formed at a portion which supports an outer peripheral side end of a bump foil piece 60 in a surface supporting the bump foil piece 60 in the base plate 30, and the bump foil piece 60 includes three parts as shown in FIGS. 7, 8A, 8B, 8C, and 8D. Additionally, FIG. 7 is a top view of the thrust bearing 3C (3), FIG. 8A is a cross-sectional view taken along a line 8A-8A of FIG. 7, FIG. 8B is an explanatory diagram in which a top view and a side view of the support area 31 of the base plate are correlated with each other, FIG. 8C is a top view of the bump foil piece 60, and FIG. 8D is an explanatory diagram in which a top view and a side view are correlated with each other in order to describe the bump foil piece 60 and the support area 31 of the base plate.

As shown in FIG. 8B, the base plate 30 is provided with the outer peripheral recessed portion 36 in addition to the inner peripheral recessed portion 35. In this way, the outer peripheral recessed portion 36 is formed by the following reasons.

Since the pressure of the fluid lubricating film at the outer peripheral end at the outer peripheral side of the top foil 10 (the top foil piece 11) is substantially the same as a peripheral pressure (for example, an atmospheric pressure), the film pressure of the fluid lubricating film at the outer peripheral side end decreases compared to the other outer peripheral side (the inside from the outer peripheral end). For this reason, since the top foil 10 (the top foil piece 11) is raised at both the inner peripheral end and the outer peripheral end, there is a possibility that the outer peripheral end may be partially abraded.

Here, in the embodiment, the outer peripheral recessed portion 36 is formed as described above. Since the outer peripheral recessed portion 36 is formed in a surface near the thrust collar 4 of the base plate 30 similarly to the inner peripheral recessed portion 35, the outer peripheral recessed portion is formed to be dug by about several tens of micrometers from a surface near the thrust collar 4. Here, in the embodiment, a depth d1 of the inner peripheral recessed portion 35 shown in FIG. 8B is formed to be deeper than a depth d2 of the outer peripheral recessed portion 36. This is because a portion which is located at the inner peripheral end side of the top foil piece 11 and is easily raised toward the thrust collar 4 due to a state where the circumferential speed of the thrust collar 4 at the inner peripheral end side of the thrust bearing 3 is slower than the circumferential speed at the outer peripheral end side is wider than a portion which is located at the outer peripheral end side of the top foil piece 11 and is easily raised toward the thrust collar 4 due to a state where a pressure of the fluid lubricating film at the outer peripheral end of the top foil piece 11 is the same as a peripheral pressure (for example, an atmospheric pressure).

That is, when the depth d1 of the inner peripheral recessed portion 35 is set to be deeper than the depth d2 of the outer peripheral recessed portion 36, a gap between the bump foil piece 60 and the top foil piece 11 on the inner peripheral recessed portion 35 can be larger than a gap on the outer peripheral recessed portion 36. As a result, it is possible to more effectively prevent the top foil piece 11 from moving close to the thrust collar 4 to contact therewith. Here, in order to simplify a manufacturing process, the depth d1 of the inner peripheral recessed portion 35 can be the same as the depth d2 of the outer peripheral recessed portion 36.

Further, in the embodiment, as shown in FIG. 8C, the bump foil piece 60 includes three parts, that is, a first part 61 which is the inner peripheral side end of the bump foil piece 60, a second part 62 which is the outer peripheral end thereof, and a third part 63 which is an intermediate portion between the inner peripheral side end and the outer peripheral end. As shown in FIG. 8D, the first part 61 is formed to be much smaller than the inner peripheral recessed portion 35 so that the entire first part sinks into the inner peripheral recessed portion 35 when the bump foil piece 60 is disposed on the support area 31 of the base plate 30. In the first part 61 which is disposed inside the inner peripheral recessed portion 35, a downstream end edge 61a in the rotation direction of the rotation shaft 1 is fixed to the base plate 30 by spot-welding (point-welding), and a side opposite to the end edge 61a is a free end. In this way, since the first part 61 is disposed inside the inner peripheral recessed portion 35, the first part 61 can be easily positioned on the support area 31.

The second part 62 is formed to be much smaller than the outer peripheral recessed portion 36 so that the entire second part sinks into the outer peripheral recessed portion 36 when the bump foil piece 60 is disposed on the support area 31 of the base plate 30. In the second part 62 which is disposed inside the outer peripheral recessed portion 36, a downstream end edge 62a in the rotation direction of the rotation shaft 1 is fixed to the base plate 30 by spot-welding (point-welding), and a side opposite to the end edge 62a is a free end. In this way, since the second part 62 is disposed inside the outer peripheral recessed portion 36, the second part 62 can be easily positioned on the support area 31.

In the third part 63, one side in the circumferential direction, that is, the upstream side in the rotation direction of the rotation shaft 1 is equally divided into two parts in the radial direction, and an end edge 63a which is the other side is formed as a continuous edge which is continuous in the radial direction. In this way, since the side opposite to the end edge 63a is divided into two parts, the third part 63 includes two strip-shaped divided pieces 63b and the end edge 63a. Further, the first part 61 and the second part 62 are formed to have the same radial width as the radial width of the divided pieces 63b of the third part 63. Thus, the bump foil piece 60 including the first part 61, the second part 62, and the third part 63 has a shape in which an upstream side in the rotation direction of the rotation shaft 1, that is, one side in the circumferential direction is divided into four divided pieces in appearance. Then, the innermost peripheral divided piece, that is, the first part 61 among the divided pieces is disposed inside the inner peripheral recessed portion 35, and the outermost peripheral divided piece, that is, the second part 62 is disposed inside the outer peripheral recessed portion 36.

A slit 63c is formed between two strip-shaped divided pieces 63b of the third part 63. In the embodiment, the slit 63c is formed in an arc shape which forms a part of a circle concentric with a circle formed by the outer periphery of the second part 62. The width of the slit 63c is set to a length in which two divided pieces 63b can move independently without interference. Since one side of the third part 63 is divided into two strip-shaped divided pieces 63b by the slit 63c having such a width, these two strip-shaped divided pieces 63b move independently. Further, a gap having substantially the same width as the slit 63c is formed between the first part 61 and the third part 63, and a gap having substantially the same width as the slit 63c is formed between the second part 62 and the third part 63. Accordingly, the free ends of the first part 61 and the second part 62 move independently similarly to the divided pieces 63b of the third part 63.

Additionally, also in the embodiment, the valley portion 22 and the peak portion 23 are formed in the bump foil piece 60 similarly to the bump foil piece 21 of the first embodiment.

In the thrust bearing 3C (3) of the embodiment, the inner peripheral recessed portion 35 is formed at a portion which supports the inner peripheral side end of the bump foil piece 60 to suppress the raising of the inner peripheral end side of the top foil piece 11, and the outer peripheral recessed portion 36 is formed at a portion which supports the outer peripheral end of the bump foil piece 60 to suppress the raising of the outer peripheral end side of the top foil piece 11. Thus, since it is possible to prevent the top foil piece 11 from moving close to the thrust collar 4 to come into contact therewith, it is possible to prevent a decrease in durability of the bearing or seizure. Further, since the film thickness of the fluid lubricating film at the inner peripheral end side or the outer peripheral end side is not extremely thinned, it is possible to obtain the thrust bearing 3C (3) capable of withstanding a high load.

Modified Example

Figure 9A:
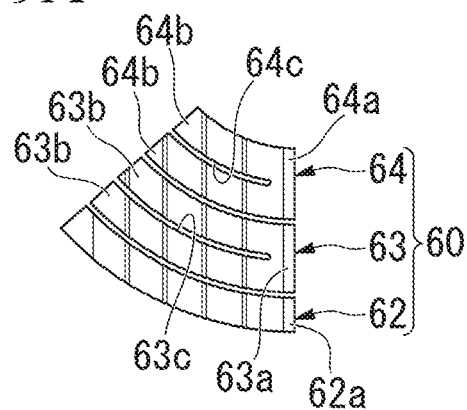
FIG. 9A is a diagram showing a modified example of the thrust bearing according to the present disclosure and is a top view of a bump foil piece.
Figure 9B:
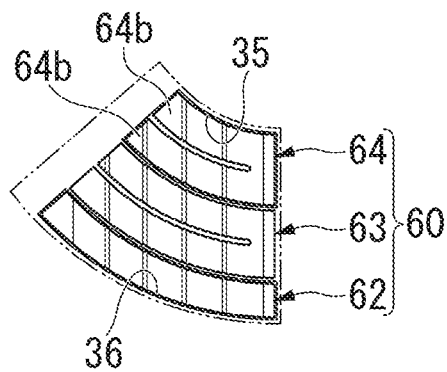
FIG. 9B is a diagram showing a modified example of the thrust bearing according to the present disclosure and is a top view illustrating a support area of a base plate and a bump foil piece.

In the fourth embodiment, the first part 61 and the second part 62 of the bump foil piece 60 are formed to have the same radial width, but for example, as shown in FIGS. 9A and 9B, the first part 61 and the second part 62 may have different shapes. The first part 64 of the bump foil piece 60 of the example shown in FIG. 9A includes two divided pieces 64b and an end edge 64a which allows two divided pieces to be continuous similarly to the third part 63.

Thus, since the bump foil piece 60 includes the first part 64, the second part 62, and the third part 63, an upstream side in the rotation direction of the rotation shaft 1 is equally divided into five divided pieces in appearance. Accordingly, the radial width of each of five divided pieces is narrower than the radial width of the divided pieces of the bump foil piece 60 shown in FIG. 8C.

Further, in the example, as shown in FIG. 9B, the radial width of the inner peripheral recessed portion 35 is wider than that of the inner peripheral recessed portion 35 shown in FIG. 8D so that the entire first part 64 enters the inner peripheral recessed portion.

The radial width of the outer peripheral recessed portion 36 is narrower than that of the outer peripheral recessed portion 36 shown in FIG. 8D.

As described above, a portion which is located at the inner peripheral end side of the top foil piece 11 and is easily raised toward the thrust collar 4 due to a state where the circumferential speed of the thrust collar 4 at the inner peripheral end side of the thrust bearing 3 is slower than the circumferential speed at the outer peripheral end side is wider than a portion which is located at the outer peripheral end side of the top foil piece 11 and is easily raised toward the thrust collar 4 due to a state where a pressure of the fluid lubricating film at the outer peripheral end of the top foil piece 11 is the same as a peripheral pressure (for example, an atmospheric pressure).

Thus, in the thrust bearing 3 of the example, since the radial width of the inner peripheral recessed portion 35 is set to be wider than that of the outer peripheral recessed portion 36, and a gap between the first part 64 of the bump foil piece 60 and the top foil piece 11 supported by the first part is formed in a wider range, it is possible to more effectively prevent the inner peripheral end side of the top foil piece 11 from moving close to the thrust collar 4 to come into contact therewith.

Fifth Embodiment

Figure 10A:
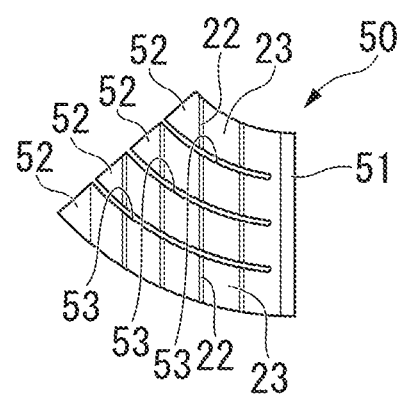
FIG. 10A is a diagram showing a fifth embodiment of the thrust bearing according to the present disclosure and is a top view of a bump foil piece.
Figure 10B:
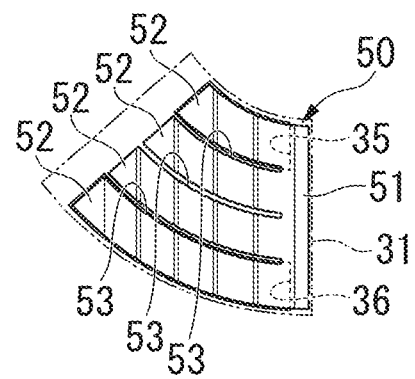
FIG. 10B is a diagram showing the fifth embodiment of the thrust bearing according to the present disclosure and is a top view illustrating a support area of a base plate and the bump foil piece.

Next, a fifth embodiment of the thrust bearing of the present disclosure will be described with reference to FIGS. 10A and 10B. Additionally, FIG. 10A is a top view of the bump foil piece 50, and FIG. 10B is a top view illustrating the support area 31 of the base plate and the bump foil piece 50. The thrust bearing of the fifth embodiment is mainly different from the thrust bearing 3C (3) of the fourth embodiment in that the bump foil piece 50 shown in FIG. 5A is used as the bump foil piece as shown in FIGS. 10A and 10B.

That is, also in the bump foil piece 50 of the embodiment shown in FIGS. 10A and 10B, an upstream side in the rotation direction of the rotation shaft 1 which is one side in the circumferential direction is equally divided into four (a plurality of) parts in the radial direction, and the end edge 51 (the fixed edge) which is the other side is formed as a continuous edge which is continuous in the radial direction. In this way, since the side opposite to the end edge 51 is divided into four parts, the bump foil piece 50 includes four strip-shaped divided pieces 52 and the fixed edge 51 (the continuous edge).

Then, also in the embodiment, as shown in FIG. 10B, the outer peripheral recessed portion 36 is formed at the outer peripheral end side of the base plate 30, that is, a portion which supports the outer peripheral end of the bump foil piece 50. An outermost peripheral divided piece 52 constituting the outer peripheral end of the bump foil piece 50 is disposed inside the outer peripheral recessed portion 36. Thus, substantially the entire outermost peripheral divided piece 52 sinks into the outer peripheral recessed portion 36.

Also in the thrust bearing 3 of the embodiment, the inner peripheral recessed portion 35 is formed at a portion which supports the inner peripheral side end of the bump foil piece 50 to suppress the raising of the inner peripheral end side of the top foil piece 11, and the outer peripheral recessed portion 36 is formed at a portion which supports the outer peripheral end of the bump foil piece 50 to suppress the raising of the outer peripheral end side of the top foil piece 11. Thus, since it is possible to prevent the top foil piece 11 from moving close to the thrust collar 4 to come into contact therewith, it is possible to prevent degradation in durability of the bearing or seizure. Further, since the film thickness of the fluid lubricating film at the inner peripheral end side or the outer peripheral end side is not extremely thinned, it is possible to obtain the thrust bearing 3 capable of withstanding a high load.

Further, since one side of the bump foil piece 50 in the circumferential direction is formed as the divided pieces 52 similarly to the second embodiment, a support force obtained by the bump foil piece 50 also smoothly changes from the inner peripheral side toward the outer peripheral side. Further, since the divided pieces 52 of the bump foil piece 50 are integrated by the end edge 51 which is the continuous edge, the bump foil piece 50 is easily handled and the bump foil piece 50 is easily fixed onto the base plate 30.

Sixth Embodiment

Next, a sixth embodiment of the thrust bearing of the present disclosure will be described.

Figure 11A:
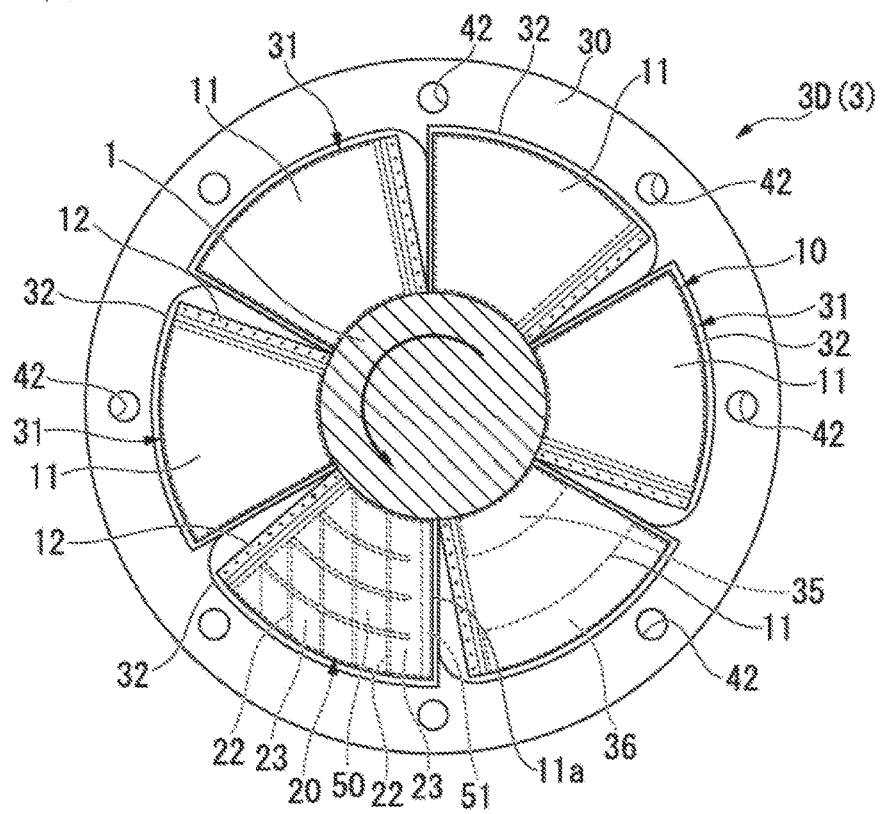
FIG. 11A is a diagram showing a sixth embodiment of the thrust bearing according to the present disclosure and is a top view of a thrust bearing 3.
Figure 11B:
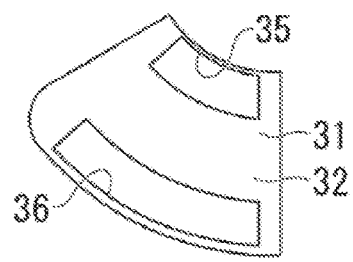
FIG. 11B is a diagram showing the sixth embodiment of the thrust bearing according to the present disclosure and is a top view of a support area of a base plate.
Figure 11C:
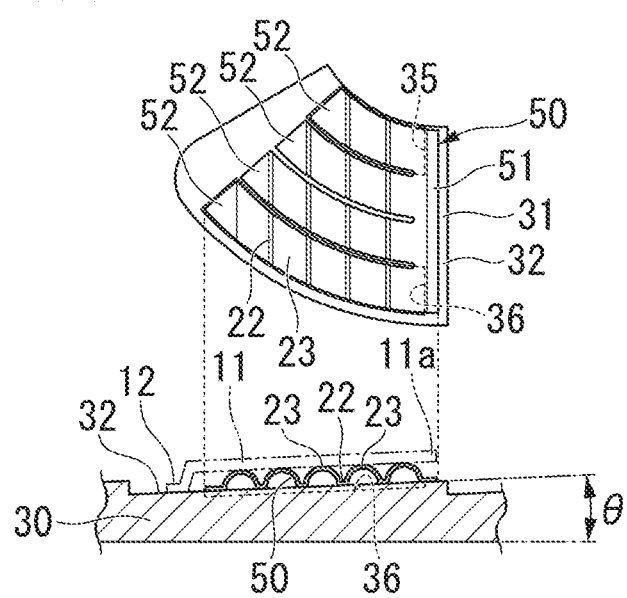
FIG. 11C is a diagram showing the sixth embodiment of the thrust bearing according to the present disclosure and is an explanatory diagram in which a top view and a side view are correlated with each other in order to describe the support area of the base plate and a bump foil piece.

A thrust bearing 3D (3) of the sixth embodiment is mainly different from the thrust bearing of the fifth embodiment in that the inclined surface 32 is formed at the support area 31 of the base plate 30, and the peak portions 23 of the bump foil piece 21 have the same height as shown in FIGS. 11A, 11B, and 11C. Additionally, FIG. 11A is a top view of the thrust bearing 3D (3), FIG. 11B is a top view of the support area 31 of the base plate, and FIG. 11C is an explanatory diagram in which a top view and a side view are correlated with each other in order to describe the support area 31 of the base plate and the bump foil piece 50.

In the embodiment, similarly to the third embodiment shown in FIGS. 6A, 6B, and 6C, an entire area which supports the bump foil piece 50 and the top foil piece 11 in the support area 31 shown in FIG. 11A is formed as the inclined surface 32 which increases in height as it goes from the fixed edge 12 of the top foil piece 11 toward the downstream end edge 11a. That is, as shown in FIG. 11C, the inclined surface 32 is formed to be inclined in a direction orthogonal to the end edge 11a.

Further, in the bump foil piece 50, similarly to the fifth embodiment, four divided pieces 52 are integrated by the end edge 51 which is the continuous edge. Thus, the bump foil piece 50 is also formed in a corrugated shape in which the valley portion 22 contacting the base plate 30 and the peak portion 23 contacting the top foil piece 11 are alternately arranged. Further, as shown in FIG. 11C, the peak portions 23 have the same height. Then, the arrangement direction of the valley portions 22 and the peak portions 23 is set to intersect the fixed edge 12 of the top foil piece 11 and to match the inclination direction of the inclined surface 32. Accordingly, the height of the peak portion 23 of the bump foil piece 50 increases by a predetermined height in the inclination direction of the inclined surface 32 of the base plate 30, that is, the direction toward the downstream side in the rotation direction of the rotation shaft 1.

Further, in the base plate 30, the inner peripheral recessed portion 35 is formed at a portion which supports the inner peripheral side end of the bump foil piece 50, and the outer peripheral recessed portion 36 is formed at a portion which supports the outer peripheral end. The innermost peripheral divided piece 52 of the bump foil piece 50 is disposed inside the inner peripheral recessed portion 35, and the outermost peripheral divided piece 52 of the bump foil piece 50 is disposed inside the outer peripheral recessed portion 36. Thus, substantially the entire innermost peripheral divided piece 52 sinks into the inner peripheral recessed portion 35, and substantially the entire outermost peripheral divided piece 52 sinks into the outer peripheral recessed portion 36.

Here, in the embodiment, a bottom surface of the inner peripheral recessed portion 35 and a bottom surface of the outer peripheral recessed portion 36 are all parallel to the inclined surface 32 of the base plate 30. Thus, the bottom surface of the inner peripheral recessed portion 35 and the bottom surface of the outer peripheral recessed portion 36 are all inclined surfaces. Accordingly, in the innermost peripheral divided piece 52 of the bump foil piece 50 sinking into the inner peripheral recessed portion 35 and the outermost peripheral divided piece 52 of the bump foil piece 50 sinking into the outer peripheral recessed portion 36, all peak portions 23 increase in height by a predetermined height as it goes toward the downstream side in the rotation direction of the rotation shaft 1. Also in the embodiment, the depth of the inner peripheral recessed portion 35 may be deeper than the depth of the outer peripheral recessed portion 36.

Also in the thrust bearing 3D (3) of the embodiment, the inner peripheral recessed portion 35 is formed at a portion which supports the inner peripheral side end of the bump foil piece 50 to suppress the raising of the inner peripheral end side of the top foil piece 11, and the outer peripheral recessed portion 36 is formed at a portion which supports the outer peripheral end of the bump foil piece 50 to suppress the raising of the outer peripheral end side of the top foil piece 11. Thus, since it is possible to prevent the top foil piece 11 from moving close to the thrust collar 4 to come into contact therewith, it is possible to prevent degradation in durability of the bearing or seizure. Further, since the film thickness of the fluid lubricating film at the inner peripheral end side or the outer peripheral end side is not extremely thinned, it is possible to obtain the thrust bearing 3D (3) capable of withstanding a high load.

Further, since the inclined surface 32 is formed at each support area 31 of the base plate 30, the peak portions 23 of the bump foil piece 21 have the same height, and the arrangement direction of the peak portions 23 matches the inclination direction of the inclined surface 32, it is possible to highly accurately change the height of the top foil piece 11 along the inclined surface 32 by disposing the top foil piece 11 on the inclined surface 32 with the bump foil piece 50 interposed therebetween. At that time, the bump foil piece 50 can be manufactured at a uniform height without a change in height of the peak portion 23 and thus an increase in manufacturing cost can be suppressed. Thus, according to the thrust bearing 3D (3), since processing is easy, mass productivity is improved and cost can be decreased. Further, since processing is easy and variations are reduced, bearing performance (for example, bearing load capacity) which is predicted at the time of designing is easily obtained.

Additionally, in the sixth embodiment, the bump foil piece 50 of the fifth embodiment is used as the bump foil piece, but the bump foil piece 60 of the fourth embodiment can be used instead. Further, the inner peripheral recessed portion 35 and the outer peripheral recessed portion 36 of the base plate 30 can be formed as shown in FIG. 9B by using the bump foil piece 60 shown in FIG. 9A.

Further, the present disclosure is not limited to the above-described embodiments and can be modified into various forms.

For example, in the above-described embodiments, the back foil 20 or the top foil 10 includes six back foil pieces 21 (the bump foil pieces 21) or six top foil pieces 11, and thus the support area 31 of the base plate 30 is formed at six positions. However, the number of back foil pieces 21 (the bump foil pieces 21) or the top foil pieces 11 may be five or less or seven or more if the number is plural. In that case, the number of the support areas 31 may match the number of the back foil pieces 21 (the bump foil pieces 21) or the top foil pieces 11.

Further, in the above-described embodiments, the bump foil piece includes the plurality of divided pieces and the continuous edge (the fixed edge) or includes the plurality of divided pieces divided into a plurality of parts in appearance and the fixed edge, but the number of the divided pieces is not limited to four or five. However, the number of divided pieces may be set arbitrarily as long as the number is two or more. Further, the radial widths of the divided pieces do not need to be the same and may be changed for every divided piece. For example, in the bump foil piece 60 shown in FIG. 9A, the first part 64 may be formed as one divided piece without using two divided pieces 64b, and the third part 63 may be also formed as one divided piece without using two divided pieces 63b.

Further, various embodiments such as the shape of the top foil piece or the bump foil piece, the arrangement of the top foil piece or the bump foil piece on the support area, the inclination direction of the inclined surface, and the like can be employed other than the above-described embodiments.

According to the thrust bearing of the present disclosure, the inner peripheral recessed portion is formed at a portion which supports the inner peripheral side end of the back foil piece in a surface supporting the back foil. For this reason, since the inner peripheral side end of the back foil piece sinks into the inner peripheral recessed portion even when the outer peripheral end side of the top foil piece is press-inserted toward one side of the back foil to move in a direction moving away from the thrust collar so that the inner peripheral end side is raised toward the thrust collar, a gap is formed between the top foil piece and the back foil piece. Thus, a force which presses back the inner peripheral end side of the top foil piece toward the thrust collar does not occur until this gap disappears. Therefore, the inner peripheral end side of the top foil piece is not raised. Thus, it is possible to prevent an extreme decrease in film thickness of the fluid lubricating film at the inner peripheral end side of the downstream end edge side of the top foil.

Further, in the thrust bearing, the back foil piece at one side in at least the circumferential direction may be divided into a plurality of divided pieces in the radial direction, and the innermost peripheral divided piece among the divided pieces may be disposed inside the inner peripheral recessed portion.

In this way, since the back foil piece at one side in the circumferential direction is divided into a plurality of parts in the radial direction, the inner peripheral divided pieces and the outer peripheral divided pieces are independently operated. Thus, deformation of the back foil piece generated when the top foil piece is pressed toward the back foil becomes smooth in the radial direction. Accordingly, a support force which is generated by the back foil piece also smoothly changes from the inner peripheral side toward the outer peripheral side. Further, since the innermost peripheral divided piece among the divided pieces is disposed inside the inner peripheral recessed portion, the inner peripheral end side of the back foil piece reliably sinks into the inner peripheral recessed portion. Thus, a gap is reliably formed between the top foil piece and the back foil piece at the inner peripheral end side of the top foil piece.

Further, in the thrust bearing, the back foil piece at the other side in the circumferential direction in the surface supporting the back foil may be formed as the continuous edge which integrates the divided pieces in the radial direction.

In this way, since the divided pieces of the back foil piece are integrated by the continuous edge, the back foil piece is easily handled and the back foil piece is easily fixed onto the base plate.

Further, in the thrust bearing, the outer peripheral recessed portion may be formed at a portion which supports the outer peripheral end of the back foil piece in the surface supporting the back foil in the base plate.

Generally, in the thrust bearing, since a pressure of the fluid lubricating film at the outer peripheral end of the top foil piece is the same as a peripheral pressure (for example, an atmospheric pressure), a film pressure of the outer peripheral end is lower than the other outer peripheral side, that is, the inner peripheral side in relation to the outer peripheral end. Thus, the outer peripheral end of the top foil piece is also easily raised toward the thrust collar similarly to the inner peripheral end side.

Here, the outer peripheral recessed portion is formed at a portion which supports the outer peripheral end of the back foil piece in the surface supporting the back foil. For this reason, since the outer peripheral end of the back foil piece sinks into the outer peripheral recessed portion even when the outer peripheral end of the top foil piece tries to be raised toward the thrust collar, a gap is formed between the top foil piece and the back foil piece. Thus, a force which presses back the outer peripheral end side of the top foil piece toward the thrust collar does not occur in the back foil piece until this gap disappears and thus the outer peripheral end side of the top foil piece is not raised. Thus, it is possible to prevent an extreme decrease in film thickness of the fluid lubricating film at the outer peripheral end side of the downstream end edge side of the top foil.

Further, in the thrust bearing, the back foil piece at one side in at least the circumferential direction may be divided into a plurality of divided pieces in the radial direction, the innermost peripheral divided piece among the divided pieces may be disposed inside the inner peripheral recessed portion, and the outermost peripheral divided piece among the divided pieces may be disposed inside the outer peripheral recessed portion.

In this way, since the back foil piece at one side in the circumferential direction is divided into a plurality of parts in the radial direction, the inner peripheral divided pieces and the outer peripheral divided pieces are operated independently. Thus, deformation of the back foil piece generated when the top foil piece is pressed toward the back foil becomes smooth in the radial direction. Thus, a support force which is generated by the back foil piece also smoothly changes from the inner peripheral side toward the outer peripheral side. Further, since the innermost peripheral divided piece among the divided pieces is disposed inside the inner peripheral recessed portion, the inner peripheral end side of the back foil piece reliably sinks into the inner peripheral recessed portion. Thus, a gap is reliably formed between the top foil piece and the back foil piece at the inner peripheral end side of the top foil piece. Similarly, since the outermost peripheral divided piece among the divided pieces is disposed inside the outer peripheral recessed portion, the outer peripheral end side of the back foil piece reliably sinks into the outer peripheral recessed portion. Thus, a gap is reliably formed between the top foil piece and the back foil piece at the outer peripheral end side of the top foil piece.

Further, in the thrust bearing, the back foil piece at the other side in the circumferential direction in the surface supporting the back foil may be formed as the continuous edge which integrates the divided pieces in the radial direction.

In this way, since the divided pieces of the back foil piece are integrated by the continuous edge, the back foil piece is easily handled and the back foil piece is easily fixed onto the base plate.

Further, in the thrust bearing, the depth of the inner peripheral recessed portion may be deeper than the depth of the outer peripheral recessed portion.

A portion which is located at the inner peripheral end side of the top foil and is easily raised toward the thrust collar due to a state where the circumferential speed of the thrust collar at the inner peripheral end side of the thrust bearing is slower than the circumferential speed at the outer peripheral end side is wider than a portion which is located at the outer peripheral end side of the top foil and is easily raised toward the thrust collar due to a state where a pressure of the fluid lubricating film at the outer peripheral end of the top foil is the same as a peripheral pressure (for example, an atmospheric pressure). Thus, since the depth of the inner peripheral recessed portion is set to be deeper than the depth of the outer peripheral recessed portion, a gap between the top foil piece and the back foil piece on the inner peripheral recessed portion becomes larger than a gap on the outer peripheral recessed portion. Accordingly, it is possible to more effectively prevent the top foil piece from moving close to the thrust collar to come into contact therewith.

INDUSTRIAL APPLICABILITY

According to the present disclosure, it is possible to provide a thrust bearing capable of withstanding a high load by suppressing a top foil piece from contacting a thrust collar.

The invention claimed is:

1. A thrust bearing which is disposed to face a thrust collar provided in a rotation shaft, comprising:
   a top foil which is disposed to face the thrust collar;
   a back foil which is disposed to face a surface opposite to a surface facing the thrust collar in the top foil and supports the top foil; and
   an annular plate-shaped base plate which is disposed at the side opposite to the top foil in the back foil and supports the back foil;
   wherein the back foil includes a plurality of back foil pieces which are arranged in a circumferential direction of the base plate,
   wherein the top foil includes a plurality of top foil pieces which are disposed on the back foil pieces,
   wherein an inner peripheral recessed portion is formed at a portion which supports an inner peripheral side end of the back foil piece in a surface supporting the back foil of the base plate, and
   wherein the back foil piece at one side in at least a circumferential direction is divided into a plurality of divided pieces in a radial direction and comprises:
      an innermost peripheral divided piece among the divided pieces that is not disposed inside the inner peripheral recessed portion, and
      a divided piece among the divided pieces that is disposed at outer peripheral side than the innermost peripheral divided piece and is not supported by the recessed portion.

2. The thrust bearing according to claim 1,
   wherein the back foil piece at the other side in the circumferential direction in the surface supporting the back foil is formed as a continuous edge integrating the divided pieces in the radial direction.

3. The thrust bearing according to claim 1,
   wherein an outer peripheral recessed portion is formed at a portion which supports an outer peripheral end of the back foil piece in a surface supporting the back foil in the base plate.

4. The thrust bearing according to claim 3,
   wherein the back foil piece at one side in at least a circumferential direction is divided into a plurality of divided pieces in a radial direction, an innermost peripheral divided piece among the divided pieces is disposed inside the inner peripheral recessed portion, and an outermost peripheral divided piece among the divided pieces is disposed inside the outer peripheral recessed portion.

5. The thrust bearing according to claim 4,
   wherein a depth of the inner peripheral recessed portion is deeper than a depth of the outer peripheral recessed portion.

6. The thrust bearing according to claim 4,
   wherein the back foil piece at the other side in the circumferential direction in the surface supporting the back foil is formed as a continuous edge integrating the divided pieces in the radial direction.

7. The thrust bearing according to claim 6,
   wherein a depth of the inner peripheral recessed portion is deeper than a depth of the outer peripheral recessed portion.

8. The thrust bearing according to claim 3,
   wherein a depth of the inner peripheral recessed portion is deeper than a depth of the outer peripheral recessed portion.

9. A thrust bearing comprising:
   a base plate;
   a step formed at the base plate and recessed from an outer peripheral side to an inner peripheral side;
   a back foil comprising a first divided piece disposed at inner peripheral side of a slit, and a second divided piece disposed at outer peripheral side of the slit,
   a top foil which is supported by the back foil,
   wherein the first divided piece is supported by the base plate at the inner peripheral side of the step, and
   the second divided piece is supported by the base plate at an outer peripheral side of the step.

10. The thrust bearing according to claim 9,
    wherein the base plate includes a second step at the outer peripheral side of the step and recessed from an inner peripheral side to an outer peripheral side;
    the back foil includes a third divided piece which is divided by a second slit at the outer peripheral side of the second divided piece;
    the second divided piece is supported by the base plate at the inner peripheral side of the second step; and
    the third divided piece is supported by the base plate at the outer peripheral side of the second step.

* * * * *